July 5, 1932.  C. L. PFEIFFER  1,866,128

CLUTCH

Filed May 24, 1928

Inventor
Conrad L. Pfeiffer
by *H. A. Saturn* Atty.

Patented July 5, 1932

1,866,128

UNITED STATES PATENT OFFICE

CONRAD LOUIS PFEIFFER, OF CHICAGO, ILLINOIS, ASSIGNOR TO WESTERN ELECTRIC COMPANY, INCORPORATED, OF NEW YORK, N. Y., A CORPORATION OF NEW YORK

CLUTCH

Application filed May 24, 1928. Serial No. 280,199.

This invention relates to clutches, and more particularly to an alternating current magnetic clutch.

The primary object of the present invention is to provide a simple and durable electro-magnetic engaging device for effective operation on an alternating current.

In accordance with one embodiment, the invention contemplates an alternating current magnetic clutch provided with a stator of laminated magnetic material having slots in which are mounted polyphase windings connected to a source of electric current. Constantly rotating flux of one or more pairs of poles produced by the current within the windings effects the attraction of a laminated armature attached to a shaft carrying one disk of a friction clutch.

Figure 1:
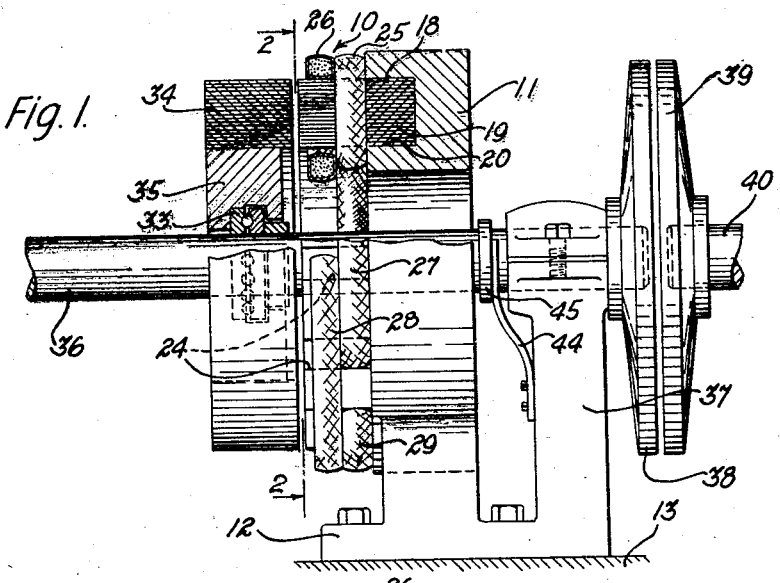
Figure 2:
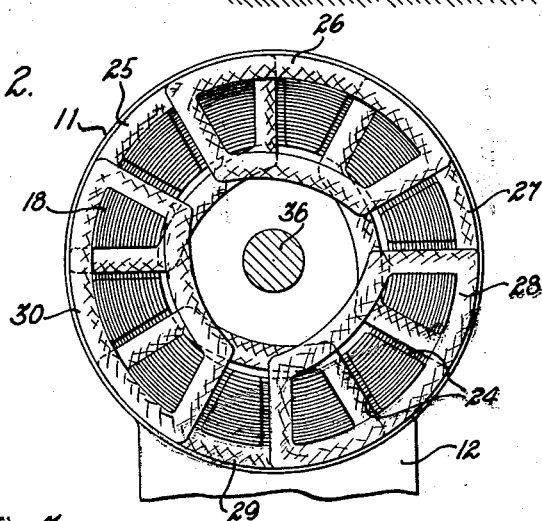
Figure 3:
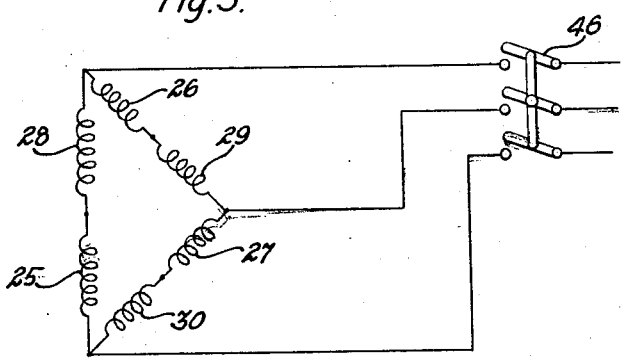

It is believed that a complete understanding of the invention may be had by reference to the following description taken in conjunction with the accompanying drawing illustrating a device embodying the invention, and in which, Fig. 1 is a front elevational view of the clutch, the upper half of the electrical actuating portion thereof being shown in longitudinal section;

Fig. 2 is a sectional view taken on line 2—2 of Fig. 1 illustrating the manner in which the stator is laminated and provided with polyphase electrical windings, and Fig. 3 is a diagrammatic representation of the winding connections.

Referring now to the drawing wherein like numerals have been employed to designate similar parts throughout the various figures, it will be observed that a stator denoted generally by the numeral 10 is rigidly supported within an annular bracket 11 composed of any suitable non-magnetic material and fastened to a frame 12 secured to a base 13. The stator 10 comprises a thin silicon steel ribbon 18 wound into a ring 19 of electrically insulated layers and retained by any suitable means (not shown) within an annular recess 20 provided in the bracket 11. Silicon steel is used on account of its extremely low hysteresis and eddy current losses, which losses are further decreased by oxidizing the surface of the silicon steel. The laminated ring 19 has radial slots 24 in which are mounted polyphase coil windings 25 to 30 inclusive, as illustrated in Fig. 2 of the drawing, or the winding may be of any other suitable type commonly used in polyphase induction motors.

An annular laminated armature 34 made from silicon steel ribbon is mounted on a non-magnetic hub 35 which is connected through a thrust bearing 33 to a shaft 36 concentric with the ring 19 and journaled within a column 37 formed as an integral part of the frame 12. The thrust bearing permits the armature 34 to remain stationary or to freely rotate. The laminated armature 34 with its thin coating of insulation between each layer prevents the inducing of eddy currents therein, and since there are no currents in the armature to react magnetically on the rotating field produced by the alternating current in the polyphase windings 25—30, there is no torque or motor action to cause rotation of the armature. Thus, the magnetic lines of force resulting from the energizing current of the polyphase windings 25—30 will be used to attract the armature but not to effect rotation thereof.

One end of the shaft 36 on which is mounted the armature 34 carries a friction disk 38 which forms the driven member of the clutch and is adapted to be brought into frictional contact with a companion driving disk 39 secured to a power driven shaft 40 in axial alignment with the shaft 36. These disks 38—39 are normally separated from each other by means of a forked compression spring 44 fastened to a side of the column 37 and bearing against a collar 45 of the shaft 36.

The polyphase windings 25—30 are positioned symmetrically within the slots 24 and are delta-connected as diagrammatically illustrated in Fig. 3 of the drawing through a switch 46 to a source (not shown) of three phase alternating current. When the switch 46 is closed the polyphase currents 120° apart flow in the windings to produce a constant rotating field having revolving north and south poles which attract the armature 34 thereby compressing the spring 44 and retaining the disk 38 in contact with the rotating disk 39 to transmit power to the shaft 36.

As is well understood, all magnetic materials have a certain residual magnetism which tends to retain the armature in contact with the electro-magnet after the energizing current has been discontinued. To overcome this so called "freezing" of the armature 34 to the stator 10 and to avoid abrasion of their surfaces the armature 34 is so placed on the shaft 36 that when the friction disks 38—39 are in engagement there will still exist a very minute air gap between the armature 34 and the laminated ring 19.

In the operation of the clutch the switch 46 is closed to connect the polyphase winding of the stator 10 to a source of alternating three phase current. The current within the windings 25—30 produces a constant rotating flux of north and south poles which attract the armature 34 and thereby engage the friction clutch. When the switch 46 is opened, the energizing current, which produces the attraction or pull, is discontinued and the spring 44 then forces the friction disks 38—39 out of engagement to stop the driving of the shaft 36.

It is to be particularly noted that the invention eliminates the necessity of using slip rings or other troublesome commutating devices. Furthermore, the clutch can be advantageously used with apparatus where only alternating current is available, thereby avoiding the expense of providing a source of direct current.

It will be understood that the embodiment of the invention herein described and illustrated is merely a convenient and useful form of the invention which is capable of many other modifications without departing from the spirit and scope of the invention as defined by the appended claims.

What is claimed is:

1. In an alternating current magnetic clutch, a driving shaft, a friction disk secured to its end, a friction disk positioned opposite the first friction disk, a second shaft to the end of which said second friction disk is secured and capable of a slight longitudinal movement, a laminated alternating current stator spaced from the friction disks and surrounding the second shaft, a laminated armature free to rotate around the second shaft but fixed longitudinally thereon, said armature being positioned adjacent the stator so that electrical energization of the latter moves the armature and the second shaft endwise to cause engagement of the two friction disks to drive the second shaft, and a resilient member for normally maintaining the friction disks separated.

2. In an alternating current magnetic clutch, a power driven shaft, a friction disk secured to the end thereof, a friction disk to be driven thereby spaced opposite said first friction disk a slight distance, a second shaft secured to the friction disk to be driven and journaled to permit its own slight longitudinal movement, a resilient member pressing against a shoulder of the second shaft to maintain the friction disks separated, an alternating current stator spaced from the friction disks and surrounding the second shaft, said stator having inserted in a groove thereof a ring of insulated laminations which are slotted radially at spaced points, polyphase alternating current windings secured in the radial slots, and an armature including a ring of insulated laminations freely journaled upon the second shaft but longitudinally fixed thereto and attracted by the stator to move the friction disks into engagement with each other.

3. In an alternating current magnetic clutch, a power driven shaft, a friction disk secured to the end thereof, a second friction disk spaced opposite the first friction disk, a second shaft to be driven having its end secured to the second friction disk, means for mounting the second shaft to permit a slight longitudinal movement therein, an alternating current stator spaced from the friction disks and surrounding the second shaft, an armature freely journaled to the second shaft but longitudinally fixed thereto and attracted by the stator to move the second shaft longitudinally and thereby the friction disks into contact with each other, and means for spacing the armature sufficiently from the rotor to provide a fixed air gap therebetween in the longitudinal movement of the second shaft.

In witness whereof, I hereunto subscribe my name this 12th day of May, A. D. 1928.

CONRAD LOUIS PFEIFFER.